J. W. LATIMER.
CLUTCH SHIPPING MECHANISM.
APPLICATION FILED DEC. 2, 1908.
944,336.
Patented Dec. 28, 1909.
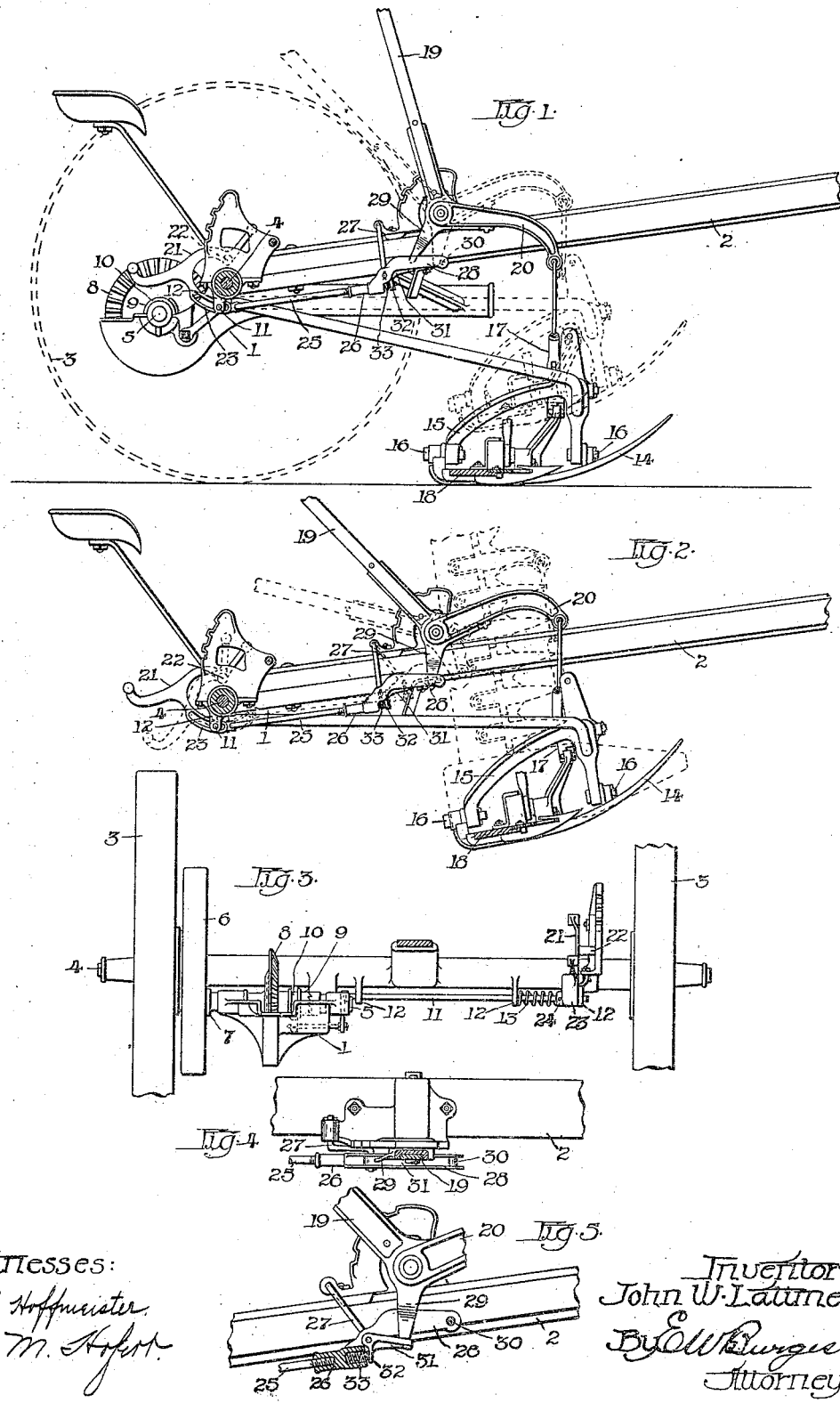
Witnesses:
F. W. Hoffmeister
W. M. Hfert
Inventor:
John W. Latimer
By E. W. Burgess
Attorney

UNITED STATES PATENT OFFICE.

JOHN W. LATIMER, OF CHICAGO, ILLINOIS, ASSIGNOR TO INTERNATIONAL HARVESTER COMPANY, A CORPORATION OF NEW JERSEY.

CLUTCH-SHIPPING MECHANISM.

944,336.              Specification of Letters Patent.     Patented Dec. 28, 1909.

Application filed December 2, 1908. Serial No. 465,739.

*To all whom it may concern:*

Be it known that I, JOHN W. LATIMER, a citizen of the United States, residing at Chicago, in the county of Cook and State of Illinois, have invented certain new and useful Improvements in Clutch-Shipping Mechanism, of which the following is a specification.

My invention relates to clutch shipping mechanism, and is adapted in particular for use in connection with mowing machines of the type commonly called vertical lift mowers, in the operation of which machines the cutter bar may be raised to a substantially vertical position, and the power transmitting mechanism designed to communicate motion from the traction wheels to the cutting apparatus be automatically disconnected therefrom in a manner to stop the motion of the latter when the cutter bar has reached a predetermined angle of elevation; the object of my invention being to provide an improved form of connecting mechanism between the cutter bar lifting devices and the clutch shipping mechanism, whereby the latter is rendered efficient and safe in operation regardless of the position of the bar lifting mechanism. This object is attained by means of the mechanism shown in the accompanying drawing, in which—

Figure 1 represents a side elevation of part of a mowing machine having my invention embodied in its construction; Fig. 2 is a side elevation, similar to Fig. 1, designed to show the operation of the clutch shipping and cutter bar raising mechanism; Fig. 3 is an end view of part of a mowing machine having my invention forming a part thereof; Fig. 4 is a detached detail drawing designed to illustrate part of the cutter bar raising and clutch shipping mechanism; and Fig. 5 is a side elevation of Fig. 4.

Like reference characters designate the same parts throughout the several views.

1 represents the frame of the machine, 2 the tongue, 3 the carrying wheels, 4 the main shaft, 5 the cross shaft, 6 the main gear wheel mounted upon the axle, 7 a pinion meshing with gear wheel 6, 8 a bevel gear mounted upon the cross shaft, and 9 a clutch mechanism adapted to connect the cutting apparatus with the source of power; the clutch mechanism including a sliding member 10, having connected therewith a clutch shipping mechanism, including a rod 11 adapted to slide in bearings 12 forming part of the machine frame and having a spring 13 operative to move the rod in one direction.

14 represents the inner shoe forming part of the cutting apparatus.

15 is a hanger, to which the shoe is pivotally connected by means of coupling pins 16, the hanger being mounted upon a coupling frame 17, and 18 represents a cutter bar secured to the shoe.

Mounted upon the frame is a hand lever 19, having a forwardly extending arm 20 that is connected with the coupling frame and cutter bar in a manner whereby the latter may be raised to a substantially vertical position, as shown by dotted lines in Fig. 2.

21 represents a clutch controlling lever pivotally connected with the machine frame at 22 and provided with a cam portion 23 having a slot therein concentric with the pivotal connection of the lever and adapted to receive the clutch shipping rod 11, the cam portion of the lever being operative against a collar 24 in a manner to move the rod in a direction to disconnect the mechanism of the cutting apparatus from its driving element and against the operative force of the spring 13, when the lever is moved in one direction.

Pivotally connected with the forward portion of the slotted cam 23 is the rear end of a link 25, the forward end of which is adjustably secured to a head piece 26, and 27 represents a link having its upper end pivotally connected with a fixed part of the machine and its lower end pivotally connected with the head piece, whereby the latter is permitted to swing about the pivotal connection of the link. The head piece is provided with a slotted portion 28, at its forward end, that is adapted to receive a downwardly projecting arm 29 forming part of the hand lever 19, the lower end of the arm extending below the head piece when the parts are in the position shown in Fig. 2, the opposite walls of the slotted portion being connected at their forward ends by means of a cross member 30 that limits a movement of the hand lever in one direction relative to the head piece. At the rear end of the slotted portion of the head piece is pivotally connected a gate 31, having a tail piece 32, and 33 represents a coiled spring received by a barrel portion of the head piece and adapted to yieldingly hold the gate within the path of the arm 29 for the purpose of causing the head and link to move rearward in a manner permitting the clutch mechanism to become engaged when the cutter bar is lowered to operative position, and when it is desired to disconnect the clutch mechanism while the bar is in operative position and the hand lever forward, the gate will contact with the arm 29 and be moved downward thereby, as shown in Fig. 5, and not prevent a forward movement of the head piece when the lever 21 is operated to disengage the clutch mechanism.

In the operation of the mechanism, when the hand lever is moved rearwardly for the purpose of raising the cutter bar, the arm 29 is free to move a limited distance without contacting with the cross member 30 of the head piece 26, as shown by dotted lines in Fig. 1; the clutch shipping mechanism being unaffected by the range of movement of the hand lever, as the cutting apparatus may remain in operative connection with the motion transmitting gearing until the cutter bar has reached a predetermined angle of elevation, beyond which it cannot be raised by means of the hand lever without the latter contacting, through the arm 29, with the clutch shipping mechanism in a manner to disconnect the latter, as shown by dotted lines in Fig. 2, and the shipping mechanism cannot be operated to connect the cutting apparatus with the driving gear when the cutter bar is in a vertical position and the hand lever thrown rearward. When the cutter bar is lowered to a predetermined angle of elevation, the clutch shipping mechanism will be automatically operated by means of the arm 29 engaging with the gate or it may be operated by means of the lever 21 in a manner to connect the cutting apparatus with its driving gear; and the driving gear may be disconnected when the cutter bar is in an operative position, the yielding gate 31 allowing the head piece to move forward or it will permit a rearward movement of the hand lever for the purpose of raising the cutter bar to a vertical position and also permit the lever 21 to be operated in a manner to disconnect the driving gear when the bar is in operative position and the hand lever in a forward position.

What I claim as my invention, and desire to secure by Letters Patent, is:

1. A clutch shipping mechanism for mowing machines including, in combination, a machine frame, a driving gear, a cutting apparatus, said cutting apparatus including a cutter bar, a clutch mechanism adapted to connect said driving gear with said cutting apparatus, a clutch shipping mechanism including a lever pivotally mounted upon said frame and adapted to control the movement of said clutch mechanism, a cutter bar adjusting mechanism including a hand lever mounted upon a fixed part of said machine frame, a clutch controlling arm forming part of said hand lever, said clutch controlling lever being provided with a lever operating member having one end connected therewith and its opposite end adapted to engage with said clutch controlling arm in a manner to unclutch said clutch mechanism when said cutter bar has reached a predetermined angle of elevation, said lever operating member having a yielding gate within the path of movement of said clutch controlling arm.

2. A clutch shipping mechanism for mowing machines including, in combination, a machine frame, a driving gear, a cutting apparatus, said cutting apparatus including a cutter bar, a clutch mechanism adapted to connect said driving gear with said cutting apparatus, a clutch shipping mechanism including a lever pivotally mounted upon said frame and adapted to control the movement of said clutch mechanism, a cutter bar adjusting mechanism including a hand lever mounted upon a fixed part of said machine frame, a clutch controlling arm forming part of said hand lever, said clutch controlling lever being provided with a lever operating member having one end connected therewith and its opposite end connected with the machine frame by means of a swinging link and adapted to engage with said clutch controlling arm in a manner to unclutch said clutch mechanism when said cutter bar has reached a predetermined angle of elevation, and a yielding gate within the path of movement of said clutch controlling arm forming part of said lever operating member.

3. A clutch shipping mechanism for mowing machines including, in combination, a machine frame, a driving gear, a cutting apparatus, said cutting apparatus including a cutter bar, a clutch mechanism adapted to connect said driving gear with said cutting apparatus, a clutch shipping mechanism including a lever pivotally mounted upon said machine frame and adapted to control the movement of said clutch mechanism, a cutter bar adjusting mechanism including a hand lever mounted upon a fixed part of said machine frame, a clutch controlling arm forming part of said hand lever, said clutch controlling lever being provided with a lever operating member, said lever operating member consisting of a link having one end pivotally connected with the clutch controlling lever and its opposite end adjustably connected with a head piece, said head piece having a slotted portion adapted to receive said clutch controlling arm, the opposite walls of said slotted portion being connected at their forward ends in a manner to engage with said arm, and a yielding gate within the path of movement of said arm and pivotally connected with said lever operating member.

JOHN W. LATIMER.

Witnesses:
 CHAS. H. CRAM,
 P. H. SHEA.